United States Patent
Spangler et al.

(10) Patent No.: US 8,240,981 B2
(45) Date of Patent: Aug. 14, 2012

(54) TURBINE AIRFOIL WITH PLATFORM COOLING

(75) Inventors: Brandon W. Spangler, Vernon, CT (US); Corneil S. Paauwe, Manchester, CT (US); Christopher J. Lehane, South Windsor, CT (US); Anita L. Tracy, Middletown, CT (US); John D. Wiedemer, Glastonbury, CT (US); Scott D. Hjelm, Windsor Locks, CT (US)

(73) Assignee: United Technologies Corporation, Hartford, CT (US)

( * ) Notice: Subject to any disclaimer, the term of this patent is extended or adjusted under 35 U.S.C. 154(b) by 1389 days.

(21) Appl. No.: 11/982,578

(22) Filed: Nov. 2, 2007

(65) Prior Publication Data
US 2009/0116953 A1    May 7, 2009

(51) Int. Cl.
*F01D 25/12* (2006.01)
(52) U.S. Cl. .................................. 415/115; 416/193 A
(58) Field of Classification Search ............... 416/193 A; 415/115, 176
See application file for complete search history.

(56) References Cited

U.S. PATENT DOCUMENTS

| | | | |
|---|---|---|---|
| 3,728,041 A | | 4/1973 | Bertelson |
| 3,752,598 A | | 8/1973 | Bowers et al. |
| 4,431,373 A | | 2/1984 | Monsarrat |
| 4,465,284 A | | 8/1984 | Szema |
| 4,557,412 A | | 12/1985 | Lillibridge et al. |
| 4,767,260 A | | 8/1988 | Clevenger et al. |
| 4,813,848 A | | 3/1989 | Novotny |
| 4,872,810 A | * | 10/1989 | Brown et al. ............... 416/145 |
| 5,167,485 A | | 12/1992 | Starkweather |
| 5,221,096 A | | 6/1993 | Heldreth et al. |
| 5,374,161 A | | 12/1994 | Kelch et al. |
| 5,513,955 A | * | 5/1996 | Barcza ........................ 416/95 |
| 5,531,457 A | | 7/1996 | Tibbott et al. |
| 6,017,189 A | * | 1/2000 | Judet et al. ................. 416/97 R |
| 6,210,111 B1 | | 4/2001 | Liang |
| 6,315,298 B1 | | 11/2001 | Kildea et al. |
| 6,457,935 B1 | * | 10/2002 | Antunes et al. ............... 415/115 |
| 6,712,581 B2 | | 3/2004 | Florjancic et al. |
| 7,021,898 B2 | * | 4/2006 | Elliott et al. ............... 416/193 A |

* cited by examiner

*Primary Examiner* — Ninh H Nguyen
(74) *Attorney, Agent, or Firm* — Carlson, Gaskey & Olds, PC

(57) ABSTRACT

Convective cooling of gas turbine engine airfoil platforms is enhanced by grooving the interface of the platforms with corresponding platform-to-platform seals, thereby accelerating cooling airflow over the platform surfaces.

24 Claims, 5 Drawing Sheets

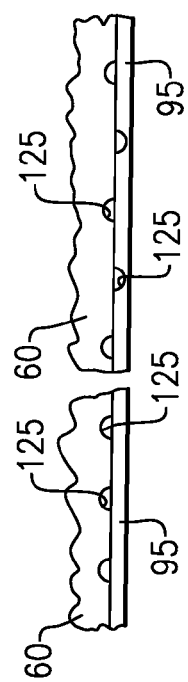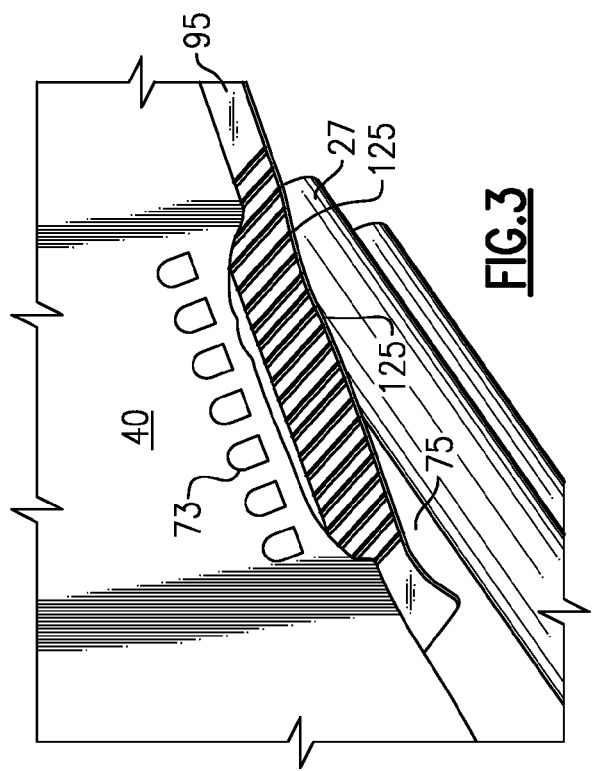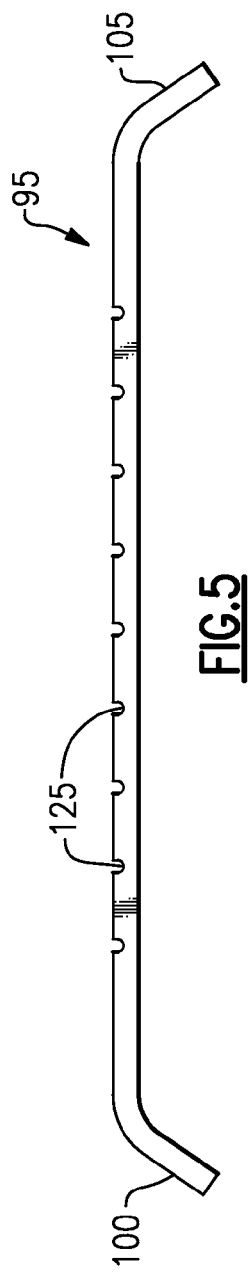

TURBINE AIRFOIL WITH PLATFORM COOLING

The U.S. Government has a paid-up license in this invention and the right in limited circumstances to require the patent owner to license others on reasonable terms as provided for by the terms of Contract No. N00019-02-C-3003 awarded by the Department of the Navy.

BACKGROUND OF THE INVENTION

1. Technical Field

This invention relates generally to aircraft gas turbine engines and particularly to the cooling of the platform sections of turbine airfoils employed in such engines.

2. Background Art

The operation of gas turbine engines is well known. Such engines include a serial arrangement of a fan, a compressor, a combustor and a turbine. Air admitted into the inlet of the engine is compressed by the engine's compressor. The compressed air is then mixed with fuel in the engine's combustor and burned. The high-energy products of combustion of the burned air-fuel mixture then enter the turbine which extracts energy from the mixture in order to drive the compressor and fan. That energy extracted by the turbine above and beyond that which is necessary to drive the compressor and fan exits the engine at the core engine exhaust nozzle thereof producing thrust which powers an associated aircraft or operates a free turbine which drives an electrical generator, pump or the like.

As gas turbine engines evolve, they have been required to produce greater and greater quantities of thrust, often resulting in higher engine operating temperatures and higher stresses in various engine components, particularly turbine blades. The combustor temperatures of modern high performance gas turbine engines often exceed the melting temperature of the materials from which the turbine blades are manufactured. Therefore, such blades must be cooled, usually by air bled off the engine's compressor. The blades are typically provided with internal cooling passages extending therethrough. Cooling air passing through the cooling passages keeps the blade cool enough to prevent the melting thereof by the high temperature combustor gases. In many respects, cooling turbine blades in this manner has been effective at minimizing oxidation, creep, and thermo-mechanical fatigue, particularly, in the airfoil sections of such blades, due in large measure to the airfoil's ability to accommodate complex networks of intricate patterns of cooling passages.

While turbine blade configurations may lend themselves to cooling airfoils in such manner, such is not necessarily the case with the blade platforms. Such platforms tend to take the shape of longitudinally and circumferentially extensive thin plates which are not conducive to the provision therein of internal cooling passages. In fact, in many instances, modern blade platforms employ no internal cooling passages at all, except perhaps for a series of cooling holes extending through the platform between the radially inner and outer major surfaces thereof. Thus, to cool such platforms, particularly in areas thereof remote of the juncture of the platform with the airfoil, it has been the practice to bathe the underside of the platform with compressor bleed cooling air and channeling the cooling air through the cooling holes to the radially outer surface of the platform where the air mixes with the engine's working fluid. In typical gas turbine engine configurations, the air which bathes the underside of the platform is, for the most part, stagnant, the flow of cooling air through the holes resulting from the difference in pressure between the cooling air and the combustion. While bathing the underside of the blade platform in stagnant compressor blade cooling air does provide some cooling, it has been observed that often, such cooling hindered by the presence of platform-to-platform seals which bear against the underside of the platform and may be insufficient to prevent oxidation, creep, and thermo-mechanical fatigue of the platform. The portion of the blade platform near the cooling holes has been particularly susceptible to thermo-mechanical fatigue which manifests itself in cracking in the high stress around the cooling holes.

DISCLOSURE OF THE INVENTION

The present invention is predicated upon the discovery that enhanced cooling of a turbine blade platform can be achieved by accelerating the essentially stagnant reservoir of air interiorly of the platform to a speed which enhances the convective cooling afforded by such air. Thus, by accelerating the cooling air from an essentially stagnant condition to a velocity which enhances the convective cooling afforded by such air, the turbine blade platforms are more effectively cooled and thermo-mechanical fatigue experienced by the platforms is greatly reduced.

In a preferred embodiment of the present invention, the cooling air acceleration is provided by grooves formed between a platform-to-platform seal and the platform's radially inner surface. The grooves provide direct exposure of the radially inner platform surface to the cooling air and reduces the flow area of the cooling air adjacent the radially inner platform surface whereby the pressure difference between the cooling air adjacent the inner surface of the seal and the working fluid flowing past the outer surface of the seal, accelerates the cooling air to the aforementioned higher velocities. The grooves may be provided in the radially outer surface of the seal, the radially inner surface of the platform, or in both those members. Typically, the grooves extend in the general direction of rotation of the engine's rotor for ease in manufacturing and to enhance the acceleration of the cooling air by establishing a circumferential pumping of the cooling air through the grooves.

BRIEF DESCRIPTION OF THE DRAWINGS

FIG. 3 is an enlarged isometric view of the turbine blade and platform seal employed in the present invention.

FIG. 5 is an enlarged side elevation of the platform seal employed in the present invention.

FIG. 6 is an enlarged fragmentary elevation of an alternate embodiment of the present invention.

DETAILED DESCRIPTION OF THE INVENTION

Figure 1:
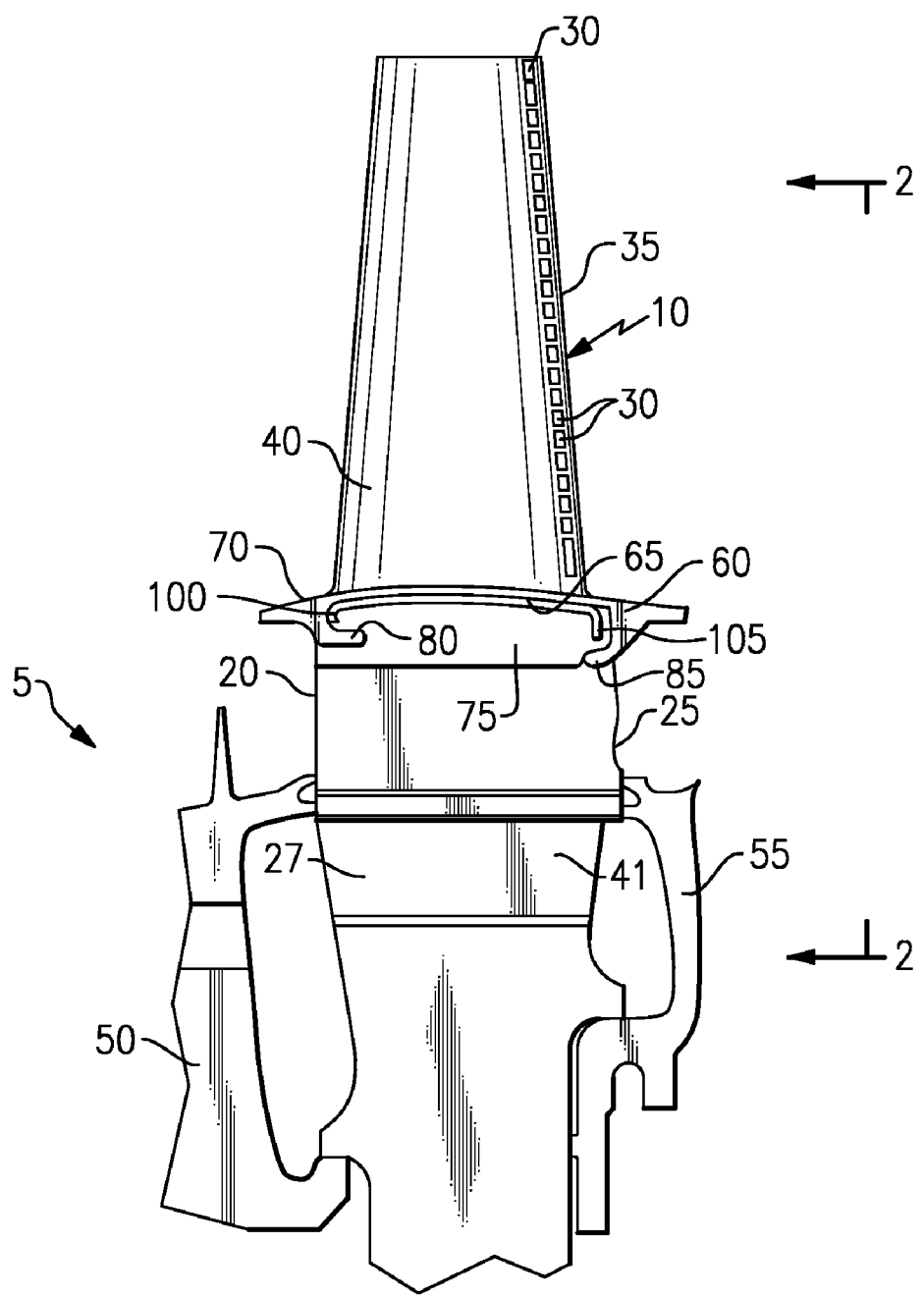
FIG. 1 is a side elevation of a high-pressure turbine blade having a platform seal mounted in a gas turbine engine-employing platform cooling in accordance with the present invention.
Figure 2:
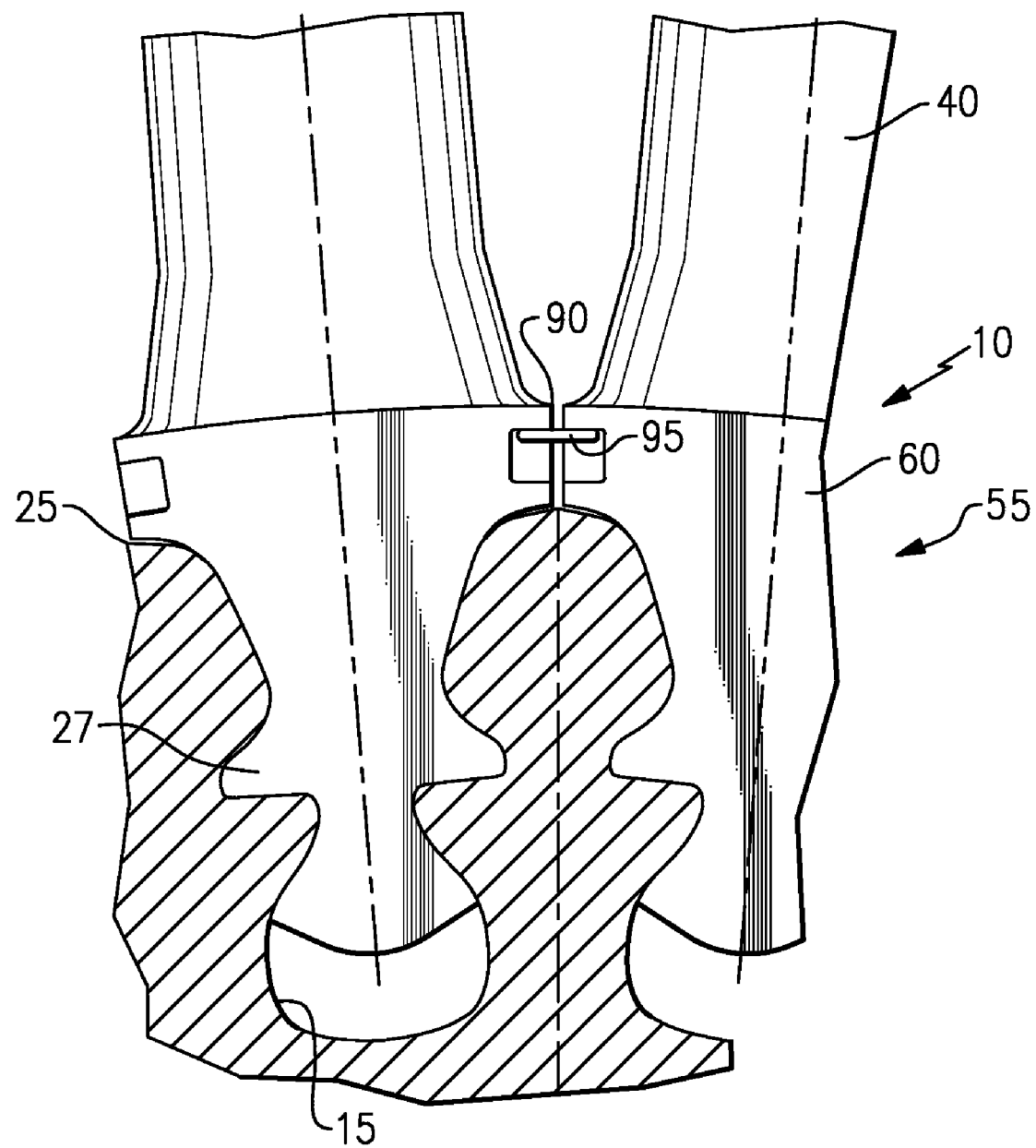
FIG. 2 is an enlarged, fragmentary elevation taken in the direction of 2-2 of FIG. 1.

Referring to the drawing and particularly to FIGS. 1 and 2 thereof, the present invention is utilized on a single stage turbine typically a high-pressure turbine of a modern gas turbine engine. The turbine rotor generally illustrated by reference number 5 is comprised of a plurality of circumferentially spaced turbine blades 10 suitably mounted in broach slots 15 formed in the rim 20 of a turbine disk 25. Preferably, the mounting of the blades to the disk is by the well-known broached-fir tree attachment at the blade's root portion 27. The blades are internally air cooled from compressor discharge air that is fed to the blade from the space between the blade and the rim of the disk by any well-known distribution system (not shown). As is well known in the art, a plurality of radially spaced apertures 30 extending adjacent to the trailing edge 35 of airfoil portion 40 of blade 10 discharges the cooling air from cooling passages internally of the blade (not shown) into the engine's working fluid (combustor discharge gases). The blades 10 are held in axial position by plates 50 and 55 mounted on the fore and aft faces of the disk 25.

Each of the blades includes a platform 60 which defines the radially inner surface of the working fluid flow path disposed between the airfoil portion 40 of the blade 10 and the root portion 27. The platform 60 extends longitudinally and circumferentially from the airfoil and abut side to side with adjacent blade platforms around the circumference of the disk. The platforms are defined in part by radially inner and outer major surfaces 65 and 70 with cooling holes 73 extending therethrough (see FIG. 3). Inner surface 65 defines the outer surface of a pocket or plenum 75 which accommodates cooling air provided by the aforementioned distribution system. The platforms also include fore and aft hooks 80 and 85 which define the fore and aft extremities of plenum 75.

As best seen in FIG. 2, to accommodate normal manufacturing tolerances and thermal expansion and contraction, there is typically a small gap 90 between the side edges of adjacent blade platforms. For optimum engine efficiency, that is, to minimize the leakage of engine working fluid out of the flow path bounded by the blade platforms adjacent platforms are sealed by a feather seal 95 which underlies a portion of the radially inner major surfaces of the adjacent platforms.

As shown in FIGS. 1, 3, 4 and 5, feather seal 95 is comprised of an elongate, generally flat, sheet metal plate having radially inwardly curved end portions 100 and 105 which loosely seat against the fore and aft ends of plenums 75 outwardly of hooks 80 and 85. The seals are typically manufactured from material such as a cobalt alloy which can withstand the heat loading from the engine's working fluid which contacts the seal through gap 90. Hooks 80 and 85 radially retain the seal within plenum 75 during static conditions, the seal being held against radially inner platform surface 65 by centrifugal force during operation of the engine.

Figure 4:
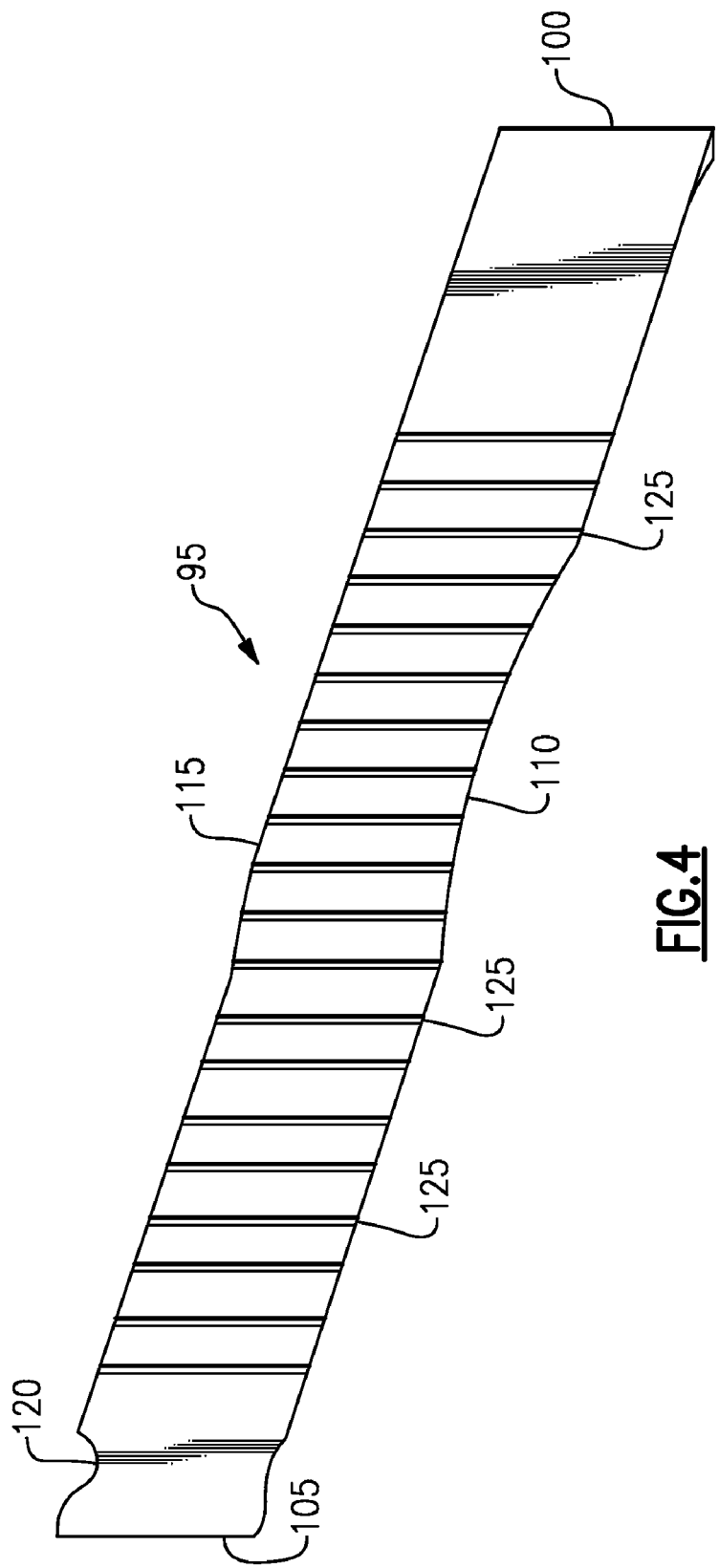
FIG. 4 is an enlarged plan view of the radially outer surface of the platform seal of the present invention.
Figure 7:
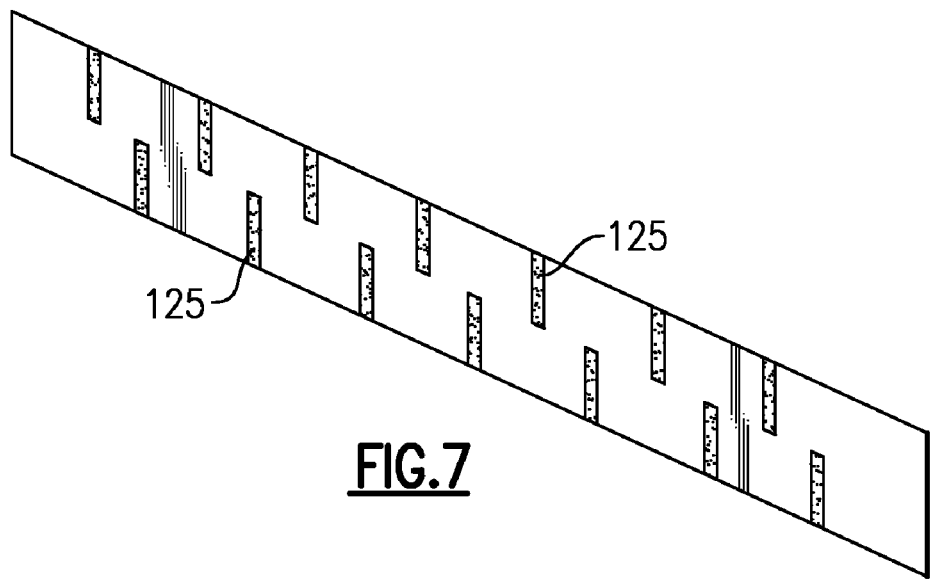
FIG. 7 is a view similar to FIG. 4, but illustrating an alternate embodiment of the platform seal employed in the present invention.
Figure 8:
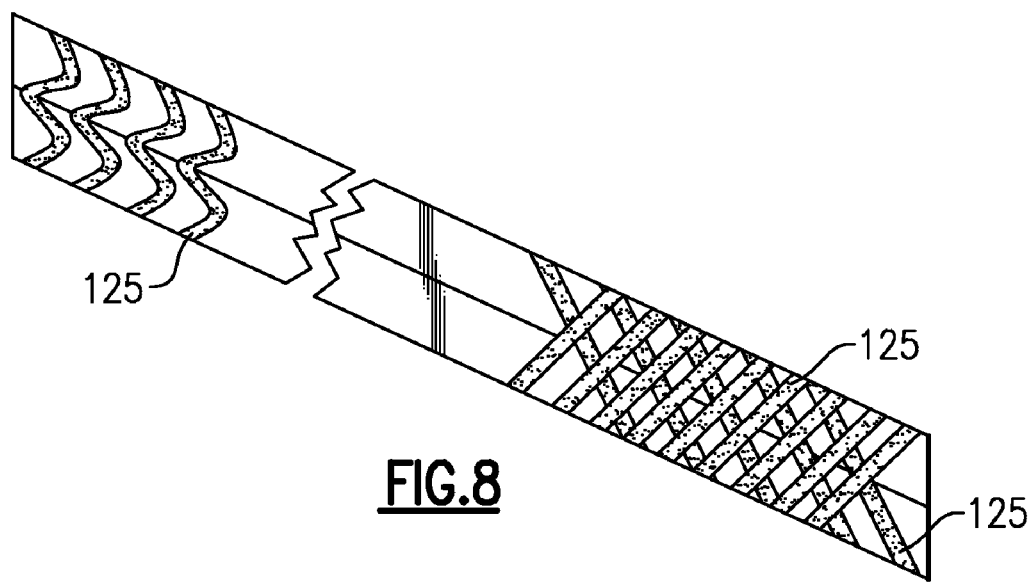
FIG. 8 is a view similar to FIG. 7, but illustrating another alternate embodiment of the platform seal employed in the present invention.

Referring to FIG. 4, the seal is generally parallelogram shaped. Portions of the longitudinal (side) edges thereof, may be concave (110) and convex (115) to accommodate suction and pressure surfaces of those portions of adjacent blade airfoil portions 40 which extend radially interiorly of the platform. The seal may also be notched as at 120 to accommodate or provide a mounting location for any suitable blade vibration damper (not shown). The feather seal is also grooved along spaced locations 125, the grooves extending generally parallel to ends 100 and 105, in the direction of rotation of the engine's rotor. Alternately, the grooves may extend partway across the seal in a staggered arrangement as shown in FIG. 7 or any other suitable pattern such as the serpentine or crosshatch patterns shown in FIG. 8.

As best seen in FIG. 3, since seal 95 is grooved along its radially outer surface, and since the width of the seal is less extensive than that of the platform, compressor discharge cooling air fills grooves 125 in the seal from plenum 75, around the longitudinal edges of the seal.

As set forth hereinabove, since the compressor cooling air is at a higher pressure than the hot combustion gases, this pressure difference causes a radially outward flow of cooling air through cooling holes 73 in the platform. However, since the high pressure cooling air interiorly of the platform is essentially stagnant and since the radially inner surfaces of the platforms are shielded by seals 95, in prior art arrangements, the only location where there is appreciable cooling air flow over the platforms is through cooling holes 73. Since the most effective cooling of turbine blades by compressor discharge air is by means of convective heat transfer, the effectiveness of which is a function of cooling air flow speed, only the interiors of the cooling holes could be cooled by such convective heat transfer.

However, in accordance with the present invention, it will be appreciated that each individual groove in feather seal 95 experiences the pressure difference between the cooling air at the radially inner surface of the platform and the combustion gases at the radially outer surface thereof. Thus, a flow of cooling air is established in each groove which in turn establishes effective convection cooling of the radially inner surfaces of the blade platforms which overlie the grooves. Cooling the platforms in this manner has, in laboratory tests, resulted in platform temperature reductions at the outer surface thereof on the order of five percent and reduced cracking in the platform areas near the cooling holes.

While a preferred embodiment of the present invention has been shown and described, it will be appreciated that various alternate embodiments will suggest themselves to those skilled in the art. For example, while grooves 125 have been shown and described as being formed in the radially outer surface of the feather seal, it will be appreciated that the enhanced convective cooling of the platforms offered by the present invention is obtainable by grooving the radially inner surface of the platform and sealing the grooves by a smooth surfaced feather seal or providing grooves in both the radially inner surface of the platform and the radially outer surface of the feather seal as shown in FIG. 6. Furthermore, while specific materials and dimensions have been shown and described, it will be appreciated that various other materials and dimensions will be applicable based on engine size, thrust output, operating parameters and the like. Finally, while the invention hereof has been described in the context of turbine blade platforms, it will be appreciated that this invention may be equally well suited for the cooling of turbine vane platforms or turbine blade outer air seal segments. Accordingly, it is intended by the appended claims to cover these and any other embodiments as will suggest themselves to those skilled in the art.

Having thus described the invention, what is claimed is:

1. A gas turbine engine comprising:
   a circumferential array of airfoils, each of said airfoils including a platform defining a radial boundary of a working fluid flow path, and wherein said airfoils comprise turbine blades with said platforms of adjacent turbine blades being spaced from each other by a gap;
   said platform including a first major surface exposed to a flow of working fluid and a second major surface defining at least in part, a cavity containing cooling air;
   the platforms of adjacent airfoils being engaged by a seal spanning said gap and which bears against said second major surfaces of said platforms across a first major surface of said seal and is exposed to said cooling air across a second major surface of said seal, and wherein said seal is defined by a length extending between first and second seal ends and is defined by a width extending between first and second longitudinal seal edges, and wherein said first and second seal ends are radially retained within said cavity;

said second major surfaces of said platforms and said first major surface of said seal defining at least one cooling air passage therebetween which establishes a flow of said cooling air through said cooling air passage, thereby enhancing the convective cooling of said platform; and said cooling air passage comprising a plurality of grooves in one of said second major surface of said platform and said first major surface of said seal such that said cooling fluid enters said cooling air passage from an end thereof and traverses said passage between said seal and said platform and exhausts along said first major surface of said seal between said adjacent platforms, and wherein said seal includes at least one of a concave or convex portion formed along at least one of said longitudinal seal edges said at least one concave or convex portion spanning multiple grooves.

2. The gas turbine engine of claim 1 wherein said platforms and said seal define a plurality of cooling air passages therebetween, extending generally in the direction of rotation of said rotor, and wherein said platforms include fore and aft hooks that define fore and aft extremities of said cavity, and wherein said first and second seal ends are radially retained within said cavity by said fore and aft hooks during static conditions.

3. The gas turbine engine of claim 1 wherein said cooling air passage comprises a groove formed in said first major surface of said seal.

4. The gas turbine engine of claim 3 wherein said groove extends generally in the direction of rotation of said rotor.

5. The gas turbine engine of claim 1 wherein said airfoils comprise turbine blades and said at least one cooling air passage comprises a groove formed in the second major surface of at least one of said platforms.

6. The gas turbine engine of claim 5 wherein said seal comprises an elongate, plate having a longitudinal axis generally parallel to longitudinal axes of said platforms.

7. The gas turbine engine of claim 6 wherein said at least one cooling air passage comprises a plurality of grooves formed in said first major surface of said seal.

8. The gas turbine engine of claim 7 wherein said grooves are sealed by a surface-to-surface contact of said first major surface of said seal with said second major surface of said platform.

9. The gas turbine engine of claim 1 wherein said at least one cooling air passage comprises a plurality of grooves formed in said first major surface of said seal.

10. The gas turbine engine of claim 9 wherein said grooves extend generally in the direction of rotation of said rotor.

11. A feather seal for sealing a gap between the respective platforms of adjacent gas turbine engine components, said feather seal including at least one cooling air passage in a major surface thereof for enhanced cooling of said platforms, and said feather seal including at least one of a concave or convex portion formed along at least one longitudinal edge of said feather seal to accommodate suction and pressure surfaces, said at least one concave or convex portion formed separate of said cooling air passage.

12. The feather seal of claim 11 wherein said cooling air passage comprises an open groove in said major surface of said feather seal, said groove being adapted for closure by surface-to-surface contact with a major surface of said platform.

13. The feather seal of claim 11 wherein said feather seal comprises an elongate sheet having a pair of longitudinal edges and adapted to bridge juxtaposed edges of adjacent turbine platforms, and wherein said at least one cooling air passage comprises a plurality of grooves at least partially spanning said elongate sheet between said longitudinal edges thereof, and wherein said at least one concave or convex portion is formed to span multiple grooves.

14. The feather seal of claim 13, wherein said grooves extend generally in the direction of rotation of a gas turbine engine.

15. The feather seal of claim 11 wherein said feather seal is defined by a length extending between first and second ends and is defined by a width extending between first and second longitudinal edges, and wherein said first and second ends are configured to be radially retained within a plenum formed within a radially inner major surface of said platform.

16. A gas turbine engine including:

at least one circular array of turbine airfoils, each of said turbine airfoils including an airfoil portion and a platform defining across a first major surface thereof, a boundary for the flow of working fluid past said airfoil portion;

each of said platforms including an opposite, second major surface communicating with a reservoir of cooling air at a pressure higher than that of said working fluid; and said gas turbine engine including flow accelerators spanning said platforms of adjacent turbine airfoil blades, said flow accelerators reducing the volume of said cooling air applied to said second major surface of said platform to accelerate the flow thereof, thereby enhancing the convection cooling of said platform by said cooling air, and wherein each flow accelerator comprises a seal defined by a length extending between first and second seal ends and defined by a width extending between first and second longitudinal seal edges, and wherein at least one of said seals and said second major surfaces of said platforms define passages fed by said reservoir of cooling air, and wherein said seal includes at least one of a concave or convex portion formed along at least one of said longitudinal seal edges, said at least one concave or convex portion spanning multiple passages.

17. The gas turbine engine of claim 16, wherein said seals span adjacent blade platforms along said second major surfaces thereof, and wherein said each platform includes fore and aft hooks that define fore and aft extremities of said reservoir of cooling air, and wherein said first and second seal ends are radially retained within said reservoir by said fore and aft hooks during static conditions.

18. The gas turbine engine of claim 17 wherein said adjacent blade platforms are spaced apart by a gap, said seals spanning said gap and said passages discharging said cooling air into said working fluid at outlets of said passages in fluid communication with said gap.

19. The gas turbine engine of claim 18 wherein said passages comprise open grooves formed in the second major surfaces of said platforms, said grooves being at least partially closed by surface-to-surface contact between said grooves and a major surface of said seal.

20. The gas turbine engine of claim 18 wherein said passages comprise grooves formed in major surfaces of said seals, said grooves being at least partially closed by surface-to-surface contact between said grooves and said second major surfaces of said platforms.

21. The gas turbine engine of claim 20, wherein said grooves are formed in a radially outer surface of said seal and said second major surface of said platform comprises a radially inner major surface thereof.

22. The gas turbine engine of claim 21 wherein said grooves in said radially outer major surface of said seal are open along those portions thereof between said adjacent turbine airfoil blade platforms in said gap.

23. A turbine blade comprising:
- an airfoil portion;
- a platform having a radially outer major surface facing said airfoil portion and a radially inner major surface defining a plenum;
- a seal having first and second seal ends that are radially retained within said plenum, and wherein said seal is defined by a length extending between said first and second seal ends and by a width extending between first and second longitudinal seal edges, and wherein said seal includes at least one of a convex or concave portion formed along at least one of said longitudinal seal edges; and
- wherein at least one of said seal and said radially inner major surface define cooling passages therein to cool said platform, said at least one of said convex or concave portion of said seal spanning multiple cooling passages.

24. The turbine blade of claim 23 wherein said platform includes fore and aft hooks that define fore and aft extremities of said plenum, and wherein said first and second seal ends are radially retained within said cavity by said fore and aft hooks during static conditions.

* * * * *